United States Patent
Tsou

(10) Patent No.: US 11,365,821 B2
(45) Date of Patent: Jun. 21, 2022

(54) PILOT RELIEF VALVE

(71) Applicant: Eric Tsou, Taipei (TW)

(72) Inventor: Eric Tsou, Taipei (TW)

( * ) Notice: Subject to any disclaimer, the term of this patent is extended or adjusted under 35 U.S.C. 154(b) by 0 days.

(21) Appl. No.: 17/010,150

(22) Filed: Sep. 2, 2020

(65) Prior Publication Data
US 2021/0404571 A1   Dec. 30, 2021

(30) Foreign Application Priority Data
Jun. 24, 2020   (TW) .................................. 109121702

(51) Int. Cl.
  *F15B 13/02*   (2006.01)
  *F16K 3/26*   (2006.01)
  *F16K 17/06*   (2006.01)

(52) U.S. Cl.
  CPC .................................. *F16K 17/065* (2013.01)

(58) Field of Classification Search
  CPC ......... F15B 13/024; F16K 17/065; F16K 3/26
  USPC ........................................ 137/625.37, 625.68
  See application file for complete search history.

(56) References Cited

U.S. PATENT DOCUMENTS

| | | | |
|---|---|---|---|
| 10,533,584 B1 * | 1/2020 | Zahe | F16K 31/406 |
| 2013/0032225 A1 * | 2/2013 | Kim | F16K 47/04 137/489.5 |

* cited by examiner

*Primary Examiner* — Paul J Gray
(74) *Attorney, Agent, or Firm* — Rabin & Berdo, P.C.

(57) ABSTRACT

A pilot relief valve is provided, including: a sleeve, a valve body, a piston, an adjusting member, a support base, a blocking member and an elastic member, all disposed inside the sleeve. The support base includes a head portion and a rod portion, the head portion includes an exhaust channel penetrating the first surface, the rod portion includes an air intake channel communicating with the exhaust channel. The blocking member is disposed on the head portion. As such, the air in the sleeve is discharged through the inside of the support base, and the hydraulic oil fills the sleeve to maintain pressure balance so that the support base and the blocking member will not thrust, the perforation of the valve body and the outlet of the tipping valve remains unblocked, and the pressure of the hydraulic oil is stable when the hydraulic oil enters the hydraulic cylinder.

13 Claims, 15 Drawing Sheets

PILOT RELIEF VALVE

CROSS-REFERENCE TO RELATED APPLICATION

This application claims the priority of Taiwanese patent application No. 109121702, filed on Jun. 24, 2020, which is incorporated herewith by reference.

BACKGROUND OF THE INVENTION

1. Field of the Invention

The present invention relates generally to a pilot relief valve.

2. The Prior Arts

A dump truck usually controls the tilt of truck body through a weightlifting hydraulic system. The weightlifting hydraulic system of the vehicle uses air pressure to control the hydraulic pressure, and the hydraulic pump inputs the hydraulic oil to the tipping valve.

The tipping valve is usually equipped with a pilot relief valve. As shown in FIG. 1 and FIG. 2, the pilot relief valve includes a sleeve 210, a valve body 220, a piston 230, an adjusting member 240, a support base 250, a blocking member 260 and an elastic member 270. Before the pressure of the hydraulic oil in the tipping valve 100 reaches a preset value, the valve body 220 closes an outlet 101 of the tipping valve 100 (as shown in FIG. 3) to prevent the hydraulic oil from entering the outlet 101 of the tipping valve 100 through the valve body 220. Also, the elastic member 270 applies elastic force to the support base 250 and the blocking member 260, so that the blocking member 260 can continuously close a through hole 2201 of the valve body 220.

As shown in FIG. 3, when the pressure of the hydraulic oil in the tipping valve 100 exceeds the preset value, the hydraulic oil pushes the blocking member 260 and the support base 250 to move, so that the blocking member 260 is separated from the through hole 2201 and the support base 250 compresses the elastic member 270. At this point, a small amount of hydraulic oil enters the inside of the sleeve 210 through the through hole 2201 and then enters the outlet 101 of the tipping valve 100 along the plurality of grooves 2203 on the outer side of the valve body 220. The hydraulic oil pushes the valve body 220 so that the plural perforations 2202 of the valve body 220 communicate with the outlet 101 of the tipping valve 100. At this point, a large amount of hydraulic oil enters the outlet 101 of the tipping valve 100 through the perforations 2202, and the hydraulic oil is further input into a hydraulic cylinder (not shown), and the hydraulic oil input into the hydraulic cylinder further pushes a piston (not shown) to control the lifting of the truck body of the dump truck (not shown).

As shown in FIG. 3, hydraulic oil will enter a gap 2503. As the pressure of the hydraulic oil gradually rises, the air pressure in the sleeve 210 is pushed by the hydraulic oil entering the gap 2503 and gradually rises too. When the air pressure in the sleeve 210 exceeds a preset value, the air will push the support base 250 and the blocking member 260 to move together in the direction of the valve body 220, so that the air can pass through the gap 2503, and then follow the space between the sleeve 210 and the valve body 220 to enter the outlet 101 of the tipping valve 100. The hydraulic oil continues to enter the inside of the sleeve 210 until all the air in the sleeve 210 is discharged and the hydraulic oil fills the inside of the sleeve 210, achieving the effect of pressure balance.

However, the force that the air pushes the support base 250 and the blocking member 260 to move is quite large. As such, the support base 250 and the blocking member 260 move rapidly in the direction of the valve body 220 in a violent manner, causing the blocking member 260 to vigorously hit the valve body 220, resulting in the following problems: first, the blocking member 260 will repeatedly open and close the through hole 2201, and the valve body 220 will repeatedly open and close the outlet 101 of the tipping valve 100, causing the pressure of the hydraulic oil in the tipping valve 100 fluctuates high and low in the process of entering the hydraulic cylinder, which is very unstable. Second, the blocking member 260 repeatedly hits the valve body 220, generating vibration and noise, and causing wear of the blocking member 260 and the valve body 220.

SUMMARY OF THE INVENTION

A primary objective of the present invention is to provide a pilot relief valve, the air in the sleeve can be discharged through the inside of the support base, hydraulic oil fills the inside of the sleeve to maintain pressure balance, the support base and the blocking member will not thrust in the direction of the valve body. The perforation of the valve body and the outlet of the tipping valve remain unblocked, the pressure of the hydraulic oil is very stable during the process of inputting the hydraulic oil in the tipping valve into the hydraulic cylinder.

Another objective of the present invention is to provide a pilot relief valve in which the blocking member will not repeatedly hit the valve body, vibration and noise will not be generated, and the blocking member and the valve body will not suffer the abrasion problem.

For achieving the foregoing objectives, the present invention provides a pilot relief valve, comprising: a sleeve, a valve body, a piston, an adjusting member, a support base, a blocking member and an elastic member. The valve body is arranged at one end of the sleeve and has a through hole. The piston is arranged in the sleeve. The adjusting member is arranged on the sleeve and used for adjusting a position of the piston. The support base is arranged in the sleeve and comprises a head portion and a rod portion. The head portion has a first surface, a second surface, and an outer side surface and at least one exhaust channel is provided. A gap is formed between the outer side surface of the head portion and an inner side surface of the sleeve. The at least one exhaust channel penetrates the first surface of the head portion, the rod portion is disposed on the second surface of the head portion and is provided with at least one air intake channel. The at least one exhaust channel communicates with the at least one air intake channel. The blocking member is arranged on the first surface of the head portion and used to open and close the through hole of the valve body. The elastic member is arranged in the sleeve and sleeved on the rod portion, with two ends of the elastic member respectively against the piston and the second surface of the head portion.

According to an embodiment of the present invention, the at least one exhaust channel comprises a first channel and a second channel, the at least one first channel penetrates through the first surface of the head portion, and the at least one second channel communicates between the at least one first channel and the at least one air intake channel.

According to an embodiment of the present invention, the head portion is provided with a plurality of exhaust channels, the second channels penetrate through the outer side surface of the head portion, and one end of each second channel is located on the outer side surface of the head portion to form an opening, and the openings of the second channels are disposed symmetrically.

According to an embodiment of the present invention, the opening of each second channel and the first channel communicating with each second channel are located on the same side of the head portion.

According to an embodiment of the present invention, the opening of each second channel and the first channel communicating with each second channel are located on opposite sides of the head portion.

According to an embodiment of the present invention, the at least one air intake channel extends along an axis of the rod portion and penetrates both ends of the rod portion.

According to an embodiment of the present invention, the first surface of the head portion is formed with a groove, the blocking member is arranged in the groove, and the first channels are arranged at intervals around the groove along a circumferential direction and form a distance from the groove.

According to an embodiment of the present invention, the at least one air intake channel is located on an outer side surface of the rod portion, extends along a length of the rod portion, and penetrates both ends of the rod portion. The at least one second channel is located on the second surface of the head portion and extends along a width of the head portion.

According to an embodiment of the present invention, the head portion is provided with a plurality of exhaust channels, the first channels are arranged at intervals along a circumferential direction, and the rod portion is provided with a plurality of air intake channels, and the air intake channels are arranged at intervals along a circumferential direction. The second channels are respectively in communication between the first channels and the air intake channels.

According to an embodiment of the present invention, the first surface of the head portion is formed with a groove, the blocking member is arranged in the groove, and the first channels surround the groove and form a distance from the groove.

The effect of the present invention is that the air in the sleeve can be discharged through the inside of the support base, hydraulic oil fills the inside of the sleeve to maintain pressure balance, the support base and the blocking member will not thrust in the direction of the valve body. The perforation of the valve body and the outlet of the tipping valve remain unblocked, the pressure of the hydraulic oil is very stable during the process of inputting the hydraulic oil in the tipping valve into the hydraulic cylinder.

Furthermore, the blocking member will not repeatedly hit the valve body, vibration and noise will not be generated, and the blocking member and the valve body will not suffer the abrasion problem.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
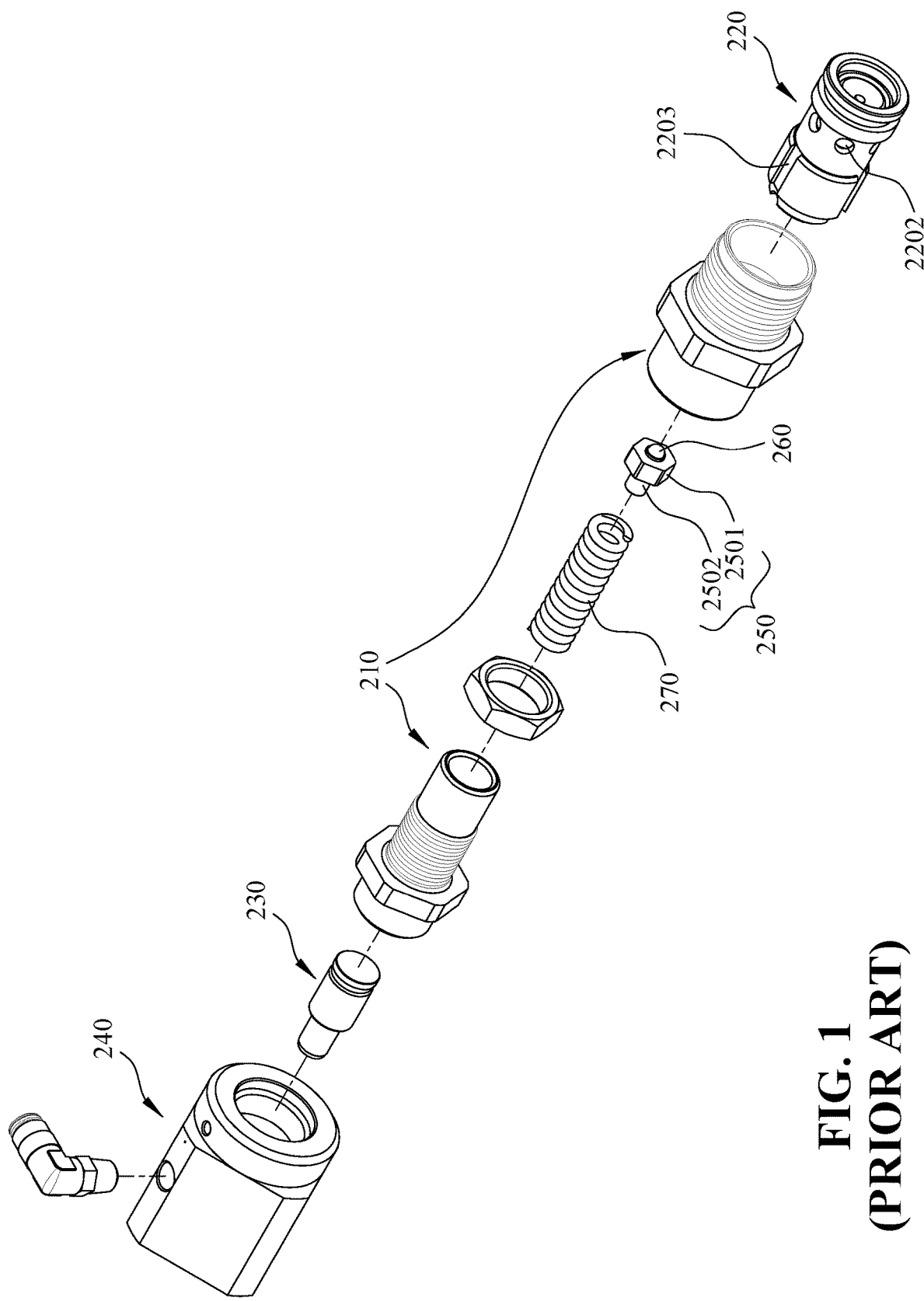
FIG. 1 shows an exploded view of the conventional pilot relief valve.
Figure 2:
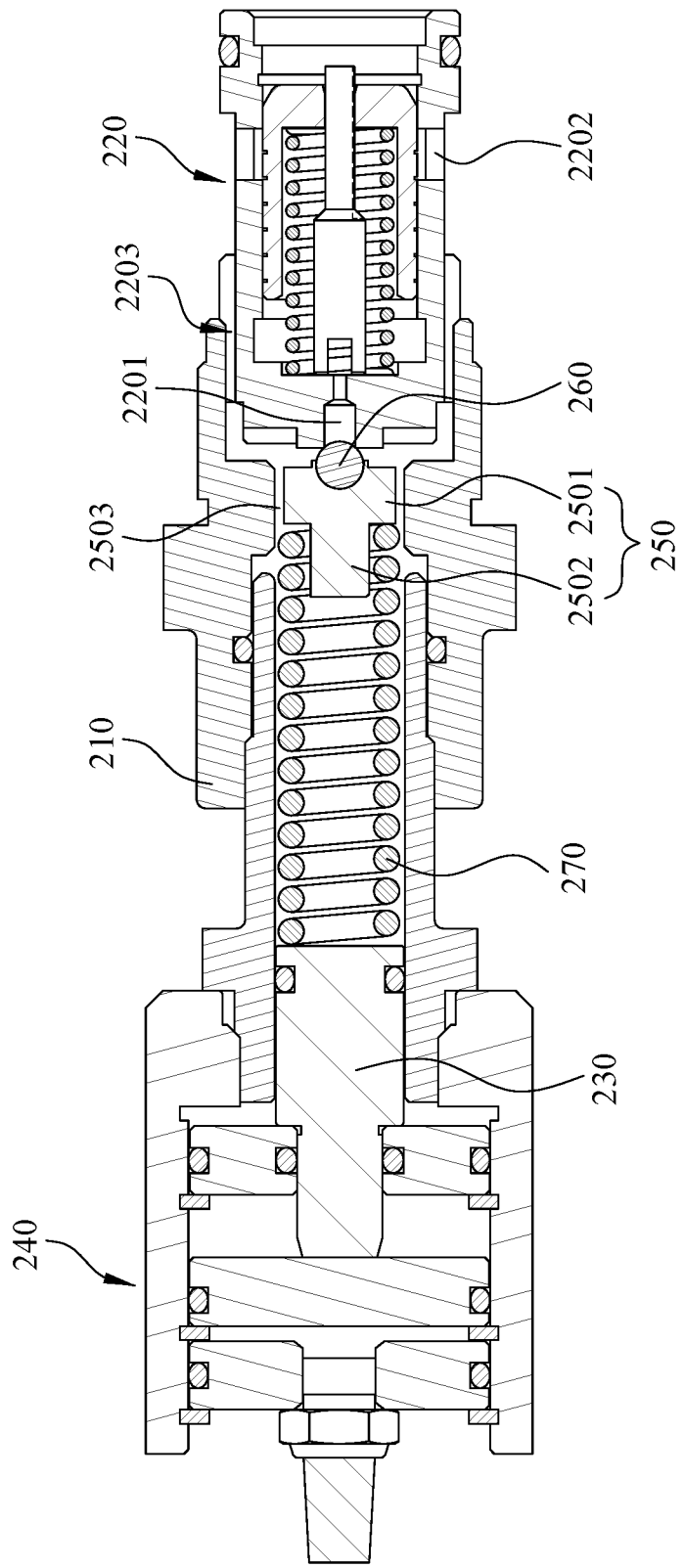
FIG. 2 shows a cross-sectional view of a conventional pilot relief valve.
Figure 3:
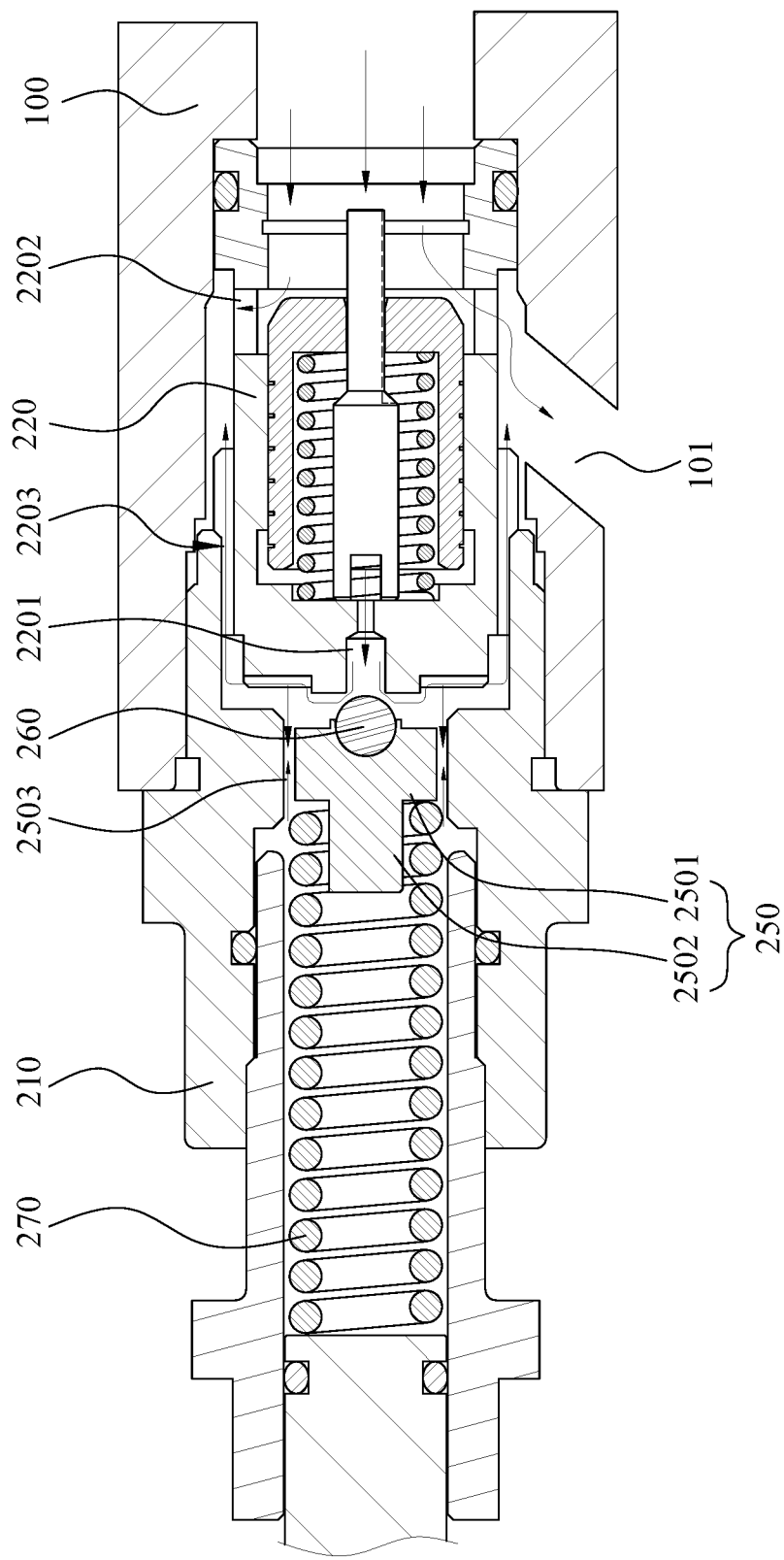
FIG. 3 shows a schematic view of the use of a conventional pilot relief valve.
Figure 4:
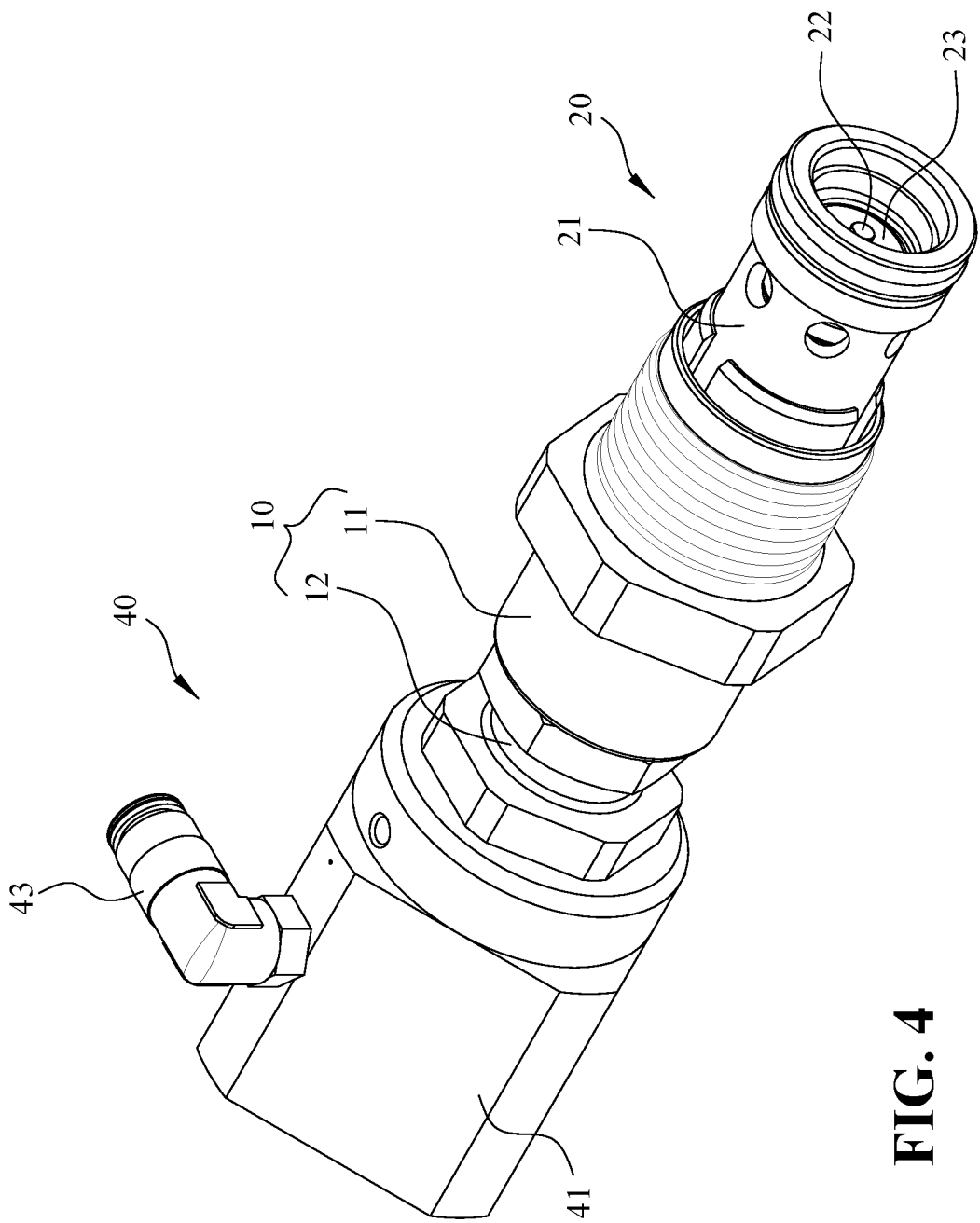
FIG. 4 shows a perspective view of the first embodiment of the present invention.
Figure 5:
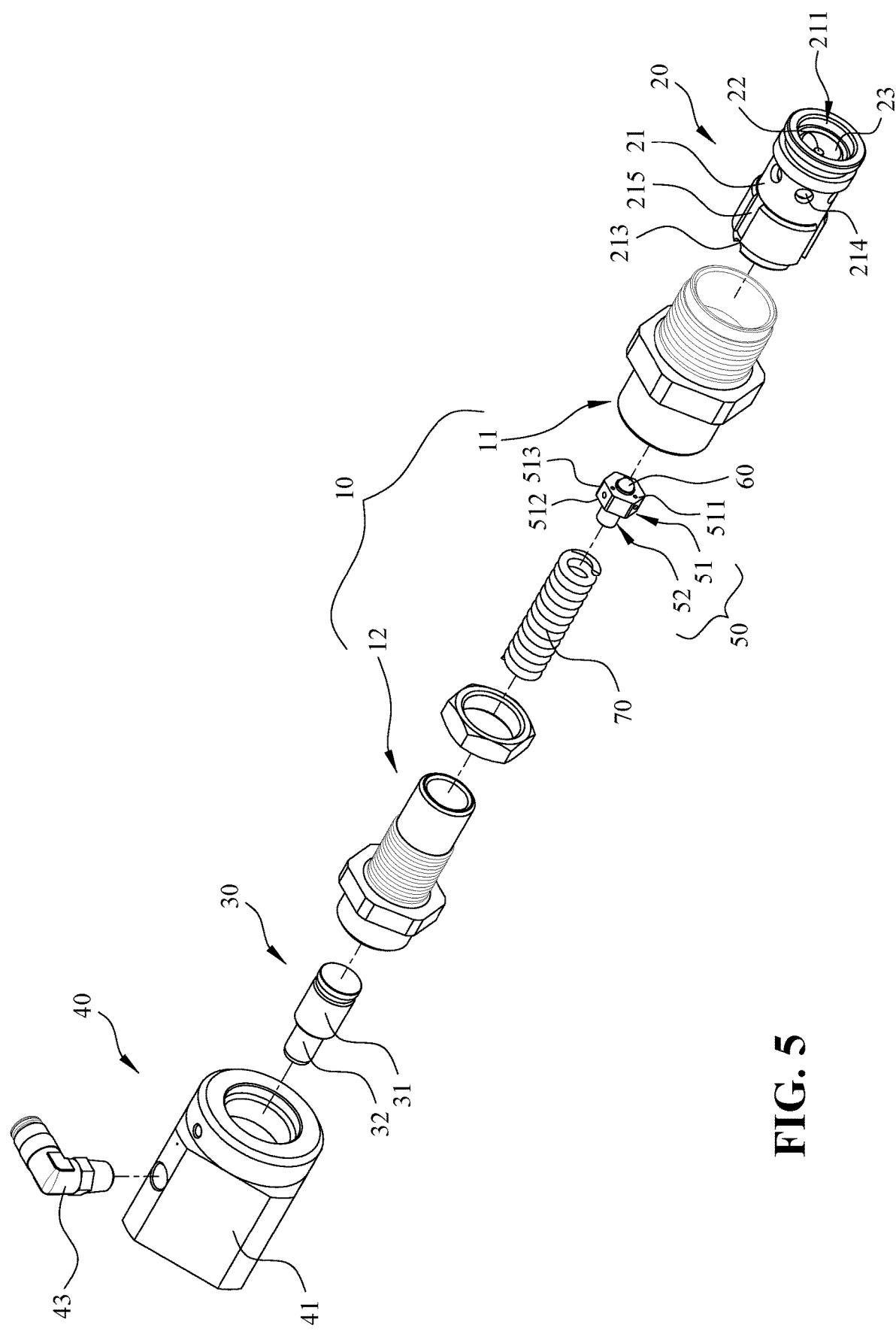
FIG. 5 shows an exploded view of the first embodiment of the present invention.
Figure 6:
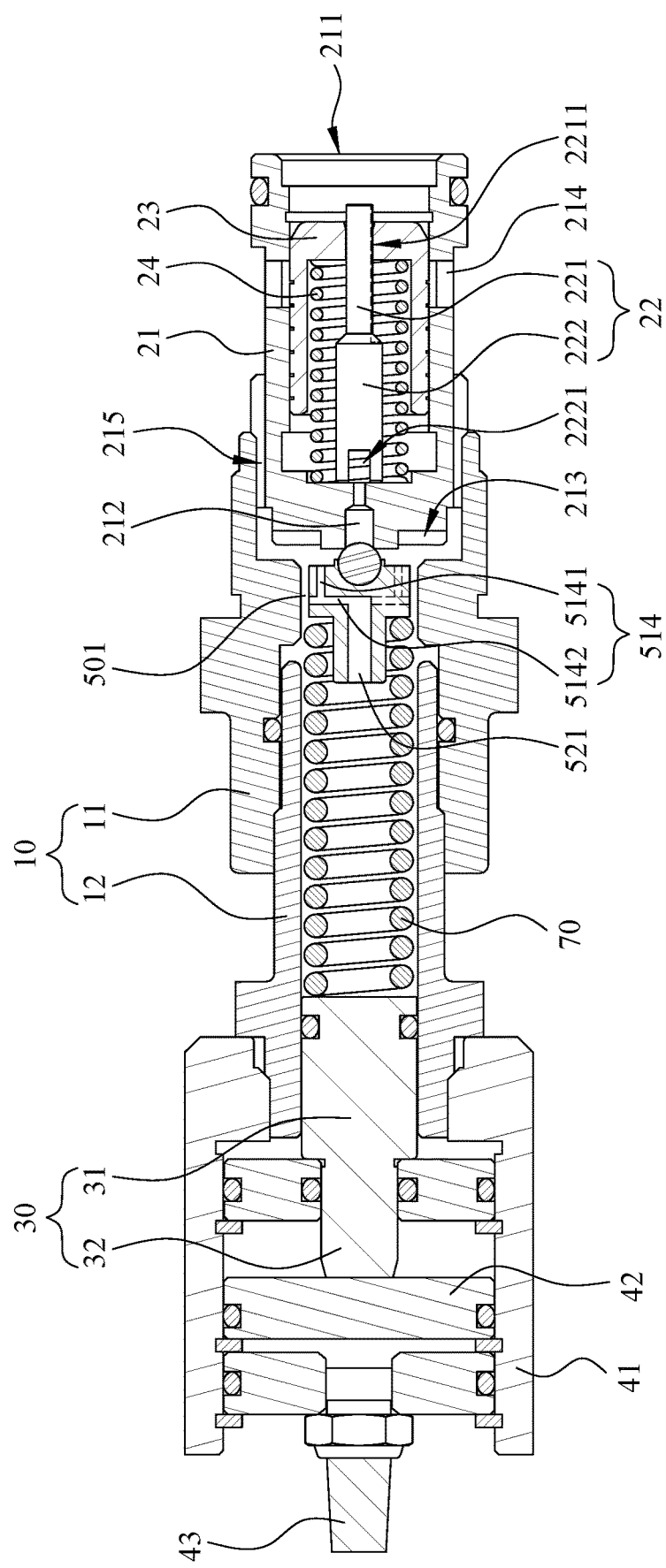
FIG. 6 shows a cross-sectional view of the first embodiment of the present invention.

As shown in FIGS. 4-6, the present invention provides a pilot relief valve, including a sleeve 10, a valve body 20, a piston 30, an adjusting member 40, a support base 50, a blocking member 60 and an elastic member 70.

Figure 10:
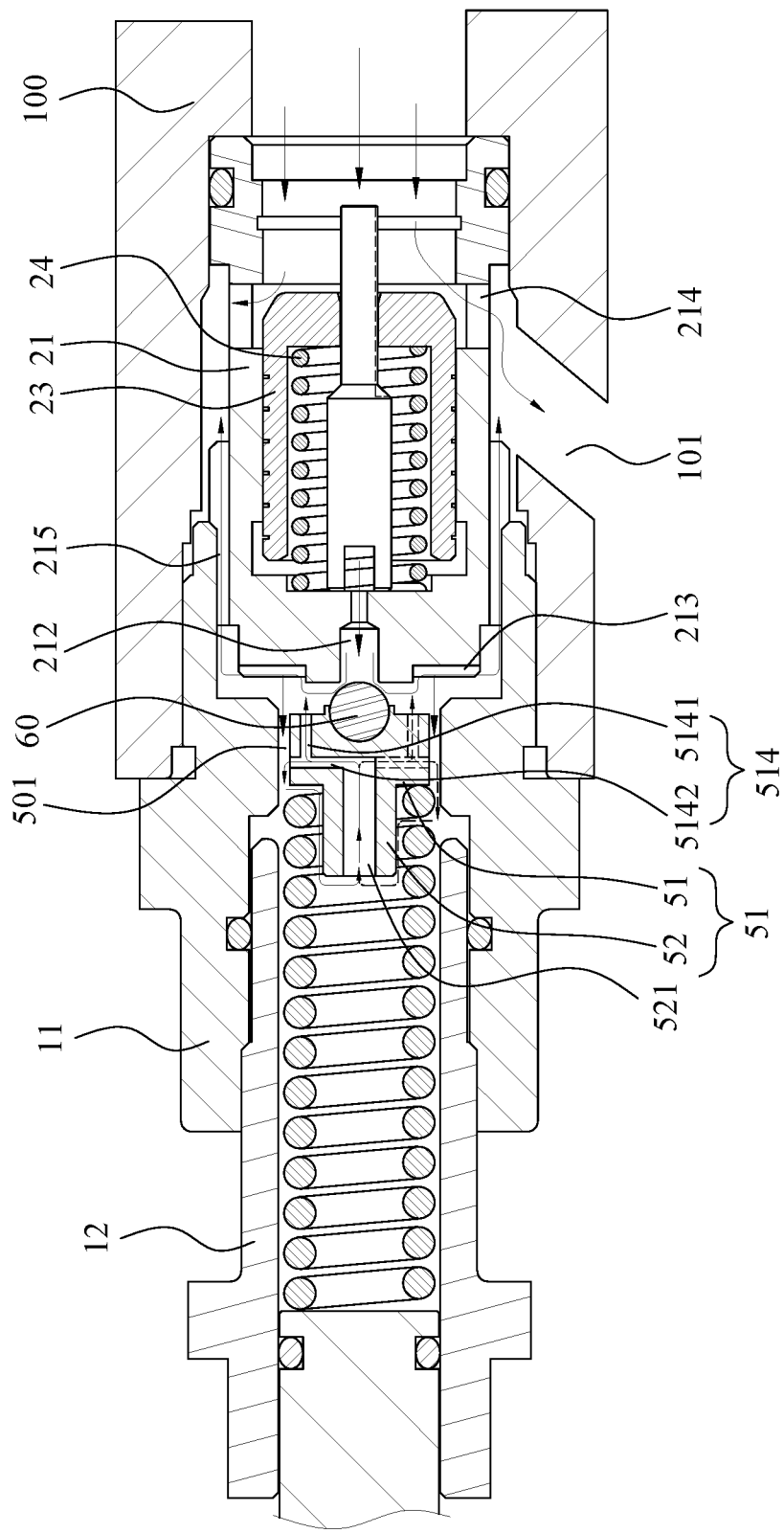
FIG. 10 shows a schematic view of the use of the first embodiment of the present invention.

The sleeve 10 includes a first cylinder portion 11 and a second cylinder portion 12. The first cylinder portion 11 has a first end and a second end, and the second cylinder portion 12 has a first end and a second end. As shown in FIG. 10, the first end of the first cylinder portion 11 is used to be inserted into a tipping valve 100, and the second end of the second cylinder portion 12 is located outside the tipping valve 100. The first end of the second cylinder portion 12 is inserted into the second end of the first cylinder portion 11, and the second end of the second cylinder portion 12 is located outside the first cylinder portion 11.

The valve body 20 includes a valve seat 21, a valve core 22, an inner cover 23 and a valve body elastic member 24. The valve seat 21 includes a first end, a second end and an outer side wall. The first end of the valve seat 21 is formed with an opening 211, and the second end of the valve seat 21 is formed with a through hole 212 and a plurality of grooves 213. A plurality of perforations 214 and a plurality of trenches 215 are formed on the outer side wall of the valve seat 21. The first end of the valve seat 21 is located outside the first cylinder portion 11 and extends into the tipping valve 100 (see FIG. 10), and the second end of the valve seat 21 is inserted into the first end of the first cylinder portion 11. The valve core 22 is disposed inside the valve seat 21 and includes a small diameter portion 221 and a large diameter portion 222. An outer side surface of the small diameter portion 221 is provided with a first flow passage 2211, and the inside of the large diameter portion 222 is provided with a second flow passage 2221. The first flow passage 2211 communicates with the second flow passage 2221, and the second flow passage 2221 communicates with the through hole 212. The hydraulic oil in the tipping valve 100 enters the through hole 212 through the first flow passage 2211 and the second flow passage 2221 in sequence (see FIG. 10). The inner cover 23 is movably sleeved on the valve core 22 and located inside the valve seat 21. The valve body elastic member 24 is sleeved on the valve core 22 and located inside the inner cover 23, with two ends abut against the valve seat 21 and the inner cover 23.

The piston 30 includes a large diameter portion 31 and a small diameter portion 32. The large diameter portion 31 is disposed in the second end of the second cylinder portion 12, and the small diameter portion 32 is located at the outside of the second end of the second cylinder portion 12.

The adjusting member 40 includes a sleeve portion 41, an adjustment piston 42 and a high-pressure air source 43. The sleeve portion 41 is disposed at the second end of the second cylinder portion 12, and the adjustment piston 42 is disposed in the sleeve portion 41. The small diameter portion 32 of the piston 30 is disposed on the adjustment piston 42, and the high-pressure air source 43 is connected to the sleeve portion 41. The high-pressure air source 43 provides a high-pressure air into the sleeve portion 41. The adjustment piston 42 is moved by the pressure of the high-pressure air to control a position of the adjustment piston 42 inside the sleeve portion 41. The adjustment piston 42 can further control a position of the piston 30 in the second end of the second cylinder portion 12.

The support base 50 is disposed in the first cylinder portion 11 and includes a head portion 51 and a rod portion 52. The head portion 51 has a first surface 511, a second surface 512, and an outer side surface 513, and is provided with at least one exhaust channel 514. A gap 501 is formed between the outer side surface 513 of the head portion 51 and an inner side surface of the first cylinder portion 11 and a first end of the at least one exhaust channel 514 penetrate through the first surface 511 of the head portion 51 and is formed with a first opening on the first surface 511 of the head portion 51. The rod portion 52 is disposed on the second surface 512 of the head portion 51 and is provided with at least one air intake channel 521. A second end of the at least one exhaust channel 514 communicates with the at least one air intake channel 521.

The blocking member 60 is disposed at the first surface 511 of the head portion 51 and used to open and close the through hole 212 of the valve seat 21. Preferably, the blocking member 60 is a steel ball.

The elastic member 70 is disposed in the second cylinder portion 12, sleeved on the rod portion 52, with two ends abut against the second surface 512 of the piston 30 and the head portion 51, respectively.

As shown in FIG. 6, before the pressure of the hydraulic oil in the tipping valve 100 reaches the preset value, the valve body elastic member 24 is maintained in a natural state and applies elastic force to the inner cover 23 so that the inner cover 23 can continuously close the perforations 214 and an outlet 101 of the tipping valve 100 to prevent hydraulic oil from entering the outlet 101 of the tipping valve 100 through the perforations 214. Also, the elastic member 70 exerts elastic force on the support base 50 and the blocking member 60 so that the blocking member 60 can continuously close the through hole 212 of the valve seat 21.

Figure 7:
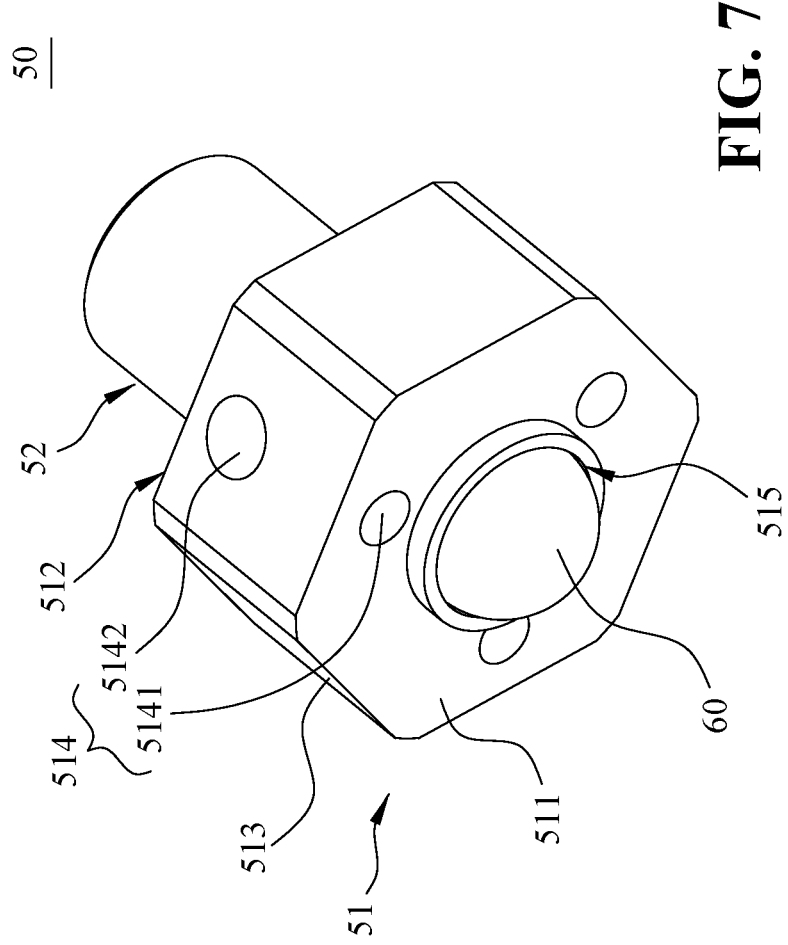
FIG. 7 shows a perspective view of the support base of the first embodiment of the present invention.
Figure 8:
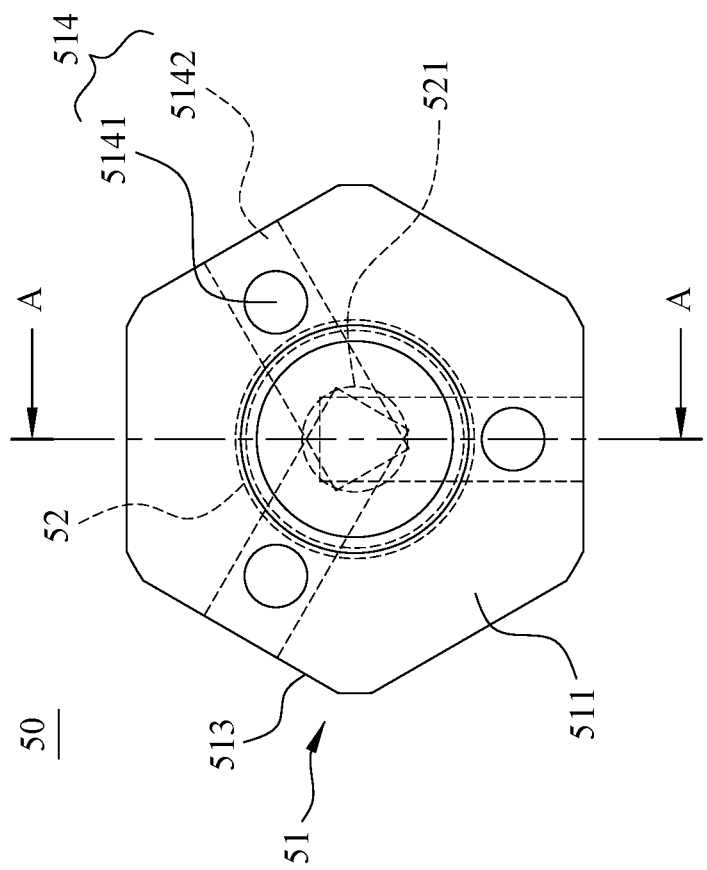
FIG. 8 shows a top view of the support base of the first embodiment of the present invention.
Figure 9:
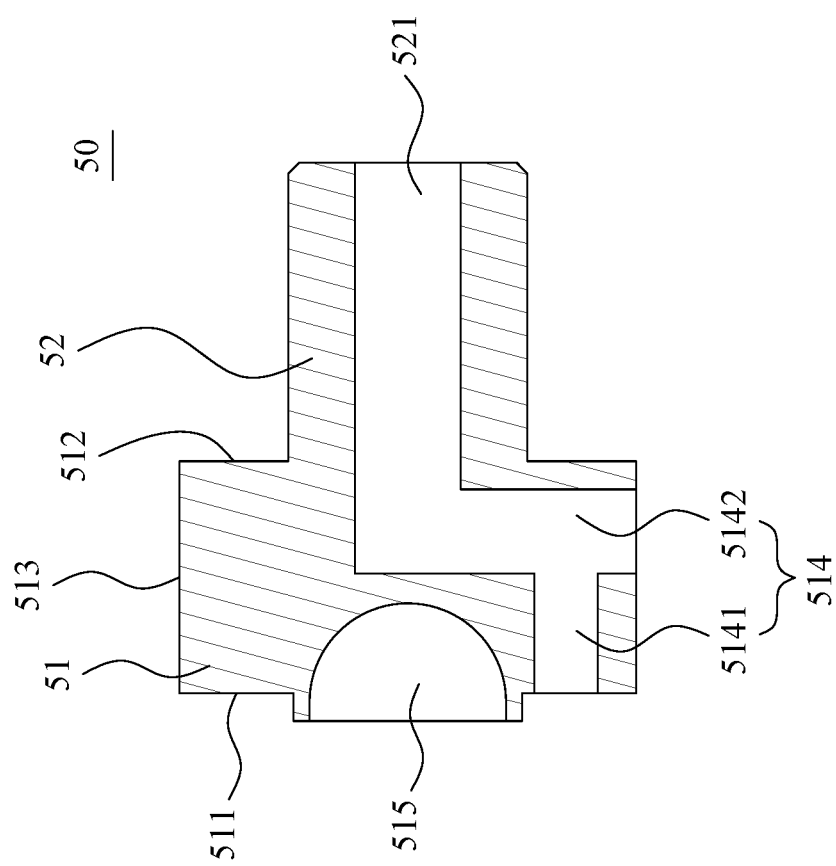
FIG. 9 shows a cross-sectional view along the line A-A of FIG. 8.

As shown in FIGS. 7-9, in the first embodiment, the head portion 51 is provided with three exhaust channels 514, and each of the exhaust channels 514 includes a first channel 5141 and a second channel 5142. First ends of the first channels 5141 penetrate the first surface 511 of the head portion 51 and are formed with the first openings on the first surface 511 of the head portion 51. The rod portion 52 is provided with an air intake channel 521. The air intake channel 521 extends along an axis of the rod portion 52 and penetrates both ends of the rod portion 52. First ends of the second channels 5142 are respectively in communication with second ends of the first channels 5141, and second ends of the second channels 5142 are in communication with the air intake channel 521.

The use of the first embodiment of the present invention will be described below in conjunction with FIG. 10.

When the pressure of the hydraulic oil in the tipping valve 100 exceeds a preset value, the hydraulic oil pushes the blocking member 60 and the support base 50 to move in the direction of the second cylinder portion 12, so that the blocking member 60 is separated from the through hole 212, and the support base 50 compresses the elastic member 70. At this point, a small amount of hydraulic oil enters the interior of the first cylinder portion 11 through the through hole 212 and then enters the outlet 101 of the tipping valve 100 along the grooves 213 and the trenches 215. The hydraulic oil pushes the inner cover 23 to move toward the inside of the valve seat 21, the through holes 214 communicate with the outlet 101 of the tipping valve 100, and the inner cover 23 compresses the valve body elastic member 24. At this point, a large amount of hydraulic oil enters the outlet 101 of the tipping valve 100 through the perforations 214, the hydraulic oil is further input into a hydraulic cylinder (not shown), and the hydraulic oil input into the hydraulic cylinder further pushes a piston (not shown) to control the tipping of a truck body (not shown) of a dump truck.

After the blocking member 60 is separated from the through hole 212, the hydraulic oil will be sprayed in the direction of the blocking member 60. When sprayed on the surface of the blocking member 60, the hydraulic oil will splash sideways and flow in an umbrella shape to pass by the first openings of the first channels 5141 on the first surface 511 of the head portion 51 to prevent hydraulic oil from flowing into the first channels 5141.

The hydraulic oil will enter the gap 501. As the pressure of the hydraulic oil gradually rises, the air in the second cylinder portion 12 is pushed by the hydraulic oil in the gap 501 to enter the first cylinder portion 11 through the air intake channel 521, the second channels 5142 and the first channels 5141, and the air entering the first cylinder portion 11 further enters the outlet 101 of the tipping valve 100 through the trenches 215.

Because the air in the second cylinder portion 12 can be discharged from the inside of the support base 50, hydraulic oil fills the inside of the second cylinder portion 12, so that the internal pressure of the sleeve 10 can be balanced, the support base 50 and the blocking member 60 will not thrust toward the valve seat 21, and the perforations 214 of the valve seat 21 and the outlet 101 of the tipping valve 100 remain unblocked. Therefore, when the hydraulic oil in the tipping valve 100 is input to the hydraulic cylinder, the pressure of the hydraulic oil is stable. In addition, the blocking member 60 will not repeatedly hit the valve seat 21, vibration and noise will not be generated, and the blocking member 60 and the valve seat 21 will not suffer from abrasion.

In addition, the air intake channel 521 of the first embodiment is located inside the rod portion 52, with the side closed while communicating with the second channels 5142, so the air enters the air intake channel 521 and is uniformly and stably distributed to the second channels 5142. The air is uniformly and stably discharged from the first channels 5141 to the outside, so that the time is shorter for discharging the air of the first embodiment from the inside of the support base 50.

As shown in FIGS. 7-9, the first ends of the second channels 5142 penetrate through the outer side surface 513 of the head portion 51 and are formed with second openings. The second openings of the second channels 5142 are arranged symmetrically. As shown in FIG. 10, during the process of air passing through the second channels 5142, part of the air will be ejected from the second openings of the second channels 5142. Because the direction of the air jetting outward is exactly symmetrical, the force of the air jetting outward can just keep the head portion 51 in balance and free of shaking or shifting, and can maintain a coaxial relationship with the sleeve 10.

As shown in FIGS. 7-9, the second opening of each of the second channels 5142 and the first channel 5141 communicating with each of the second channels 5142 are located on the same side of the head portion 51. Thereby, the thickness at the center of the head portion 51 is sufficient, the structure is strong and not easy to break, and the lifespan of the support base 50 is improved.

As shown in FIGS. 7-9, the second end of each second channel 5142 located inside the head portion 51 communicates with the air intake channel 521, and the middle of each second channel 5142 communicates with the second end of one of the first channels 5141. Because the second opening of each of the second channels 5142 and the first channel 5141 communicating with each of the second channels 5142 are located on the same side of the head portion 51, the second channel 5142 can be drilled to one end of the air intake channel 521 to communicate with the second end of one of the first channel 5141 and the air intake channel 521 at the same time. Therefore, there is no need to drill deep, which saves cost, and can avoid excessive damage to the internal structure of the head portion 51 and improve the structural strength of the head portion 51.

As shown in FIGS. 7-9, the first surface 511 of the head portion 51 is formed with a groove 515, the blocking member 60 is disposed in the groove 515, and the first channels 5141 surround the groove 515 along a circumferential direction. The first channels 5141 are arranged at intervals respectively. Each of the first openings of the first channels 5141 are located at one side of the groove 515, and a distance is formed between each of the first openings of the first channels 5141 and the groove 515. Therefore, the first openings of the first channels 5141 on the first surface 511 of the head portion 51 will not be blocked by the blocking member 60, and the air in the second cylinder portion 12 can be uniformly and smoothly discharged outward from the first channels 5141.

Figure 11:
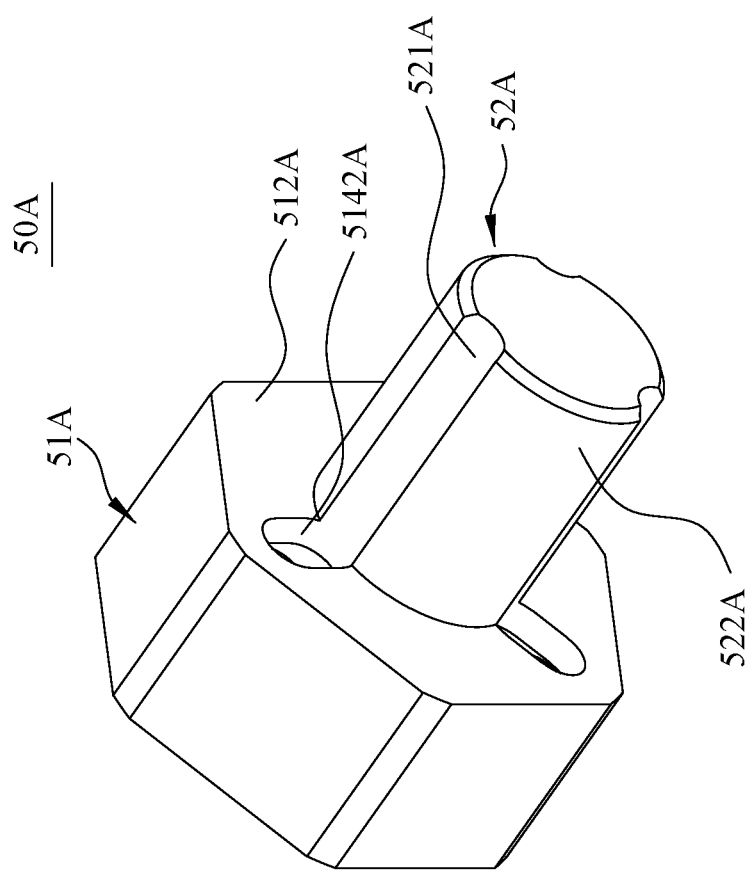
FIG. 11 shows a perspective view of the support base of the second embodiment of the present invention.
Figure 12:
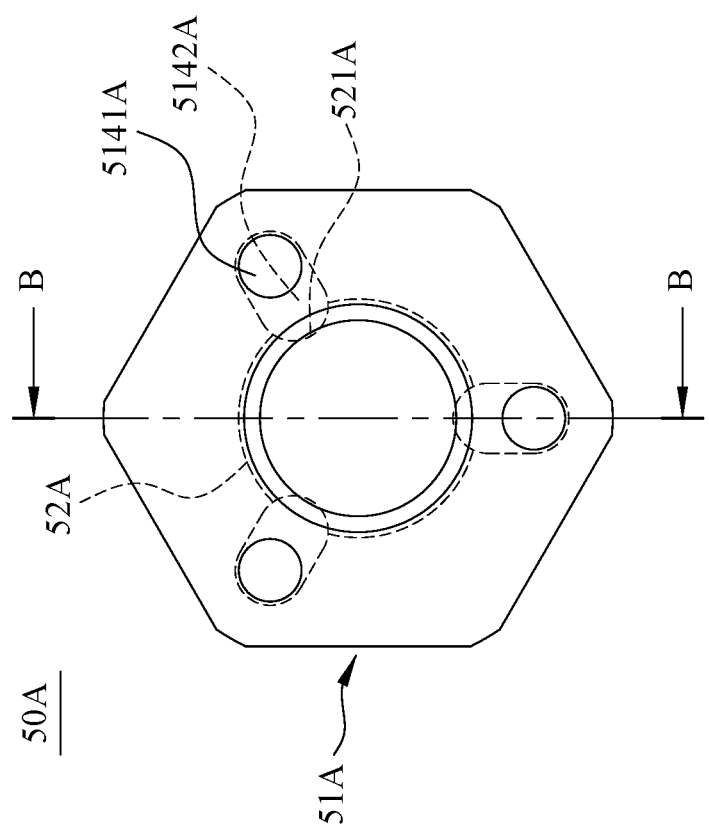
FIG. 12 shows a top view of the support base of the second embodiment of the present invention.
Figure 13:
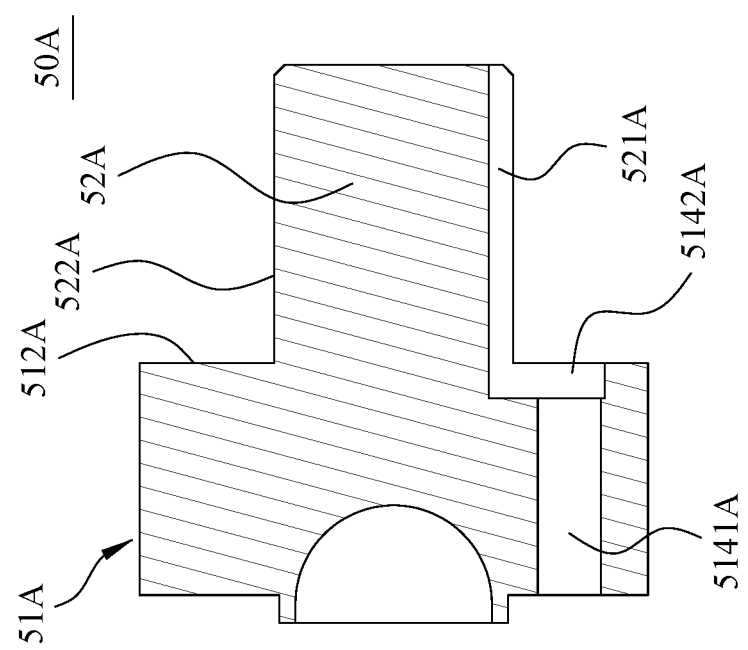
FIG. 13 shows a cross-sectional view along the line B-B in FIG. 12.

As shown in FIGS. 11-13, the difference between the second embodiment and the first embodiment is: first, the rod portion 52A is provided with three air intake channels 521A, and the air intake channels 521A are located on an outer side surface 522A of the rod portion 52A and arranged at intervals along a circumferential direction, extend along a length of the rod portion 52A, and penetrate both ends of the rod portion 52A; and secondly, the second channels 5142A are located on the second surface 512A of the head portion 51A, extending along a width direction of the head portion 51A, and respectively communicating between the first channels 5141A and the air intake channels 521A.

Compared with the first embodiment, the air intake channels 521A of the second embodiment are located on the outer side surface 522A of the rod portion 52A, the sides of which are open and communicate with the second channels 5142A, respectively. Therefore, the air is dispersed into the air intake channels 521A and enters the second channels 5142A, which may be unevenly and unstably, and the air may be discharged from the first channels 5142A unevenly and unstably. Therefore, the time is longer for the air of the second embodiment to be discharged from the inside of the support base 50A to the outside.

Compared with the first embodiment, the overall structure of the support base 50A of the second embodiment is less likely damaged, so the support base 50A of the second embodiment has a stronger structure.

Figure 14:
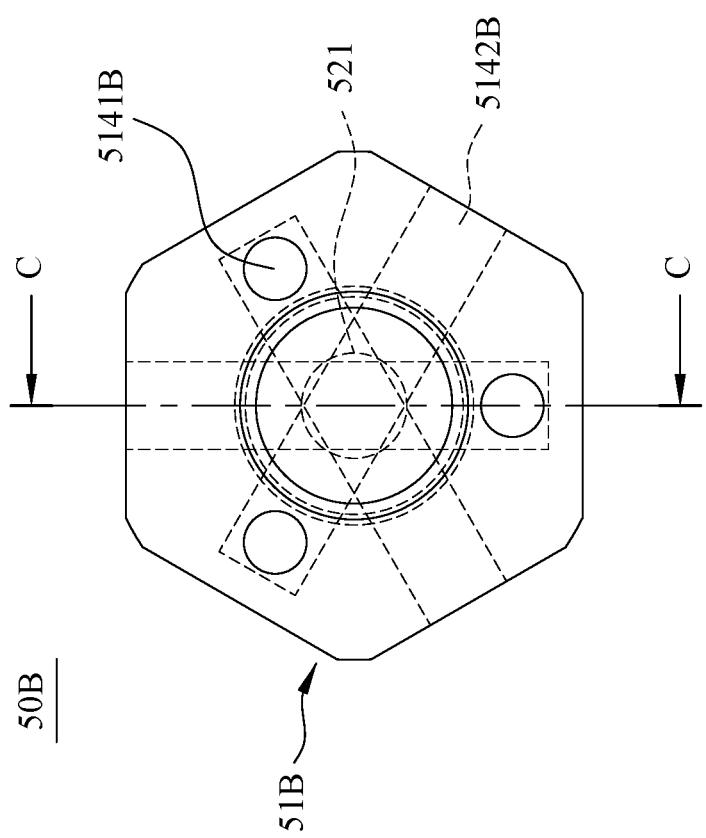
FIG. 14 shows a top view of the support base of the third embodiment of the present invention.
Figure 15:
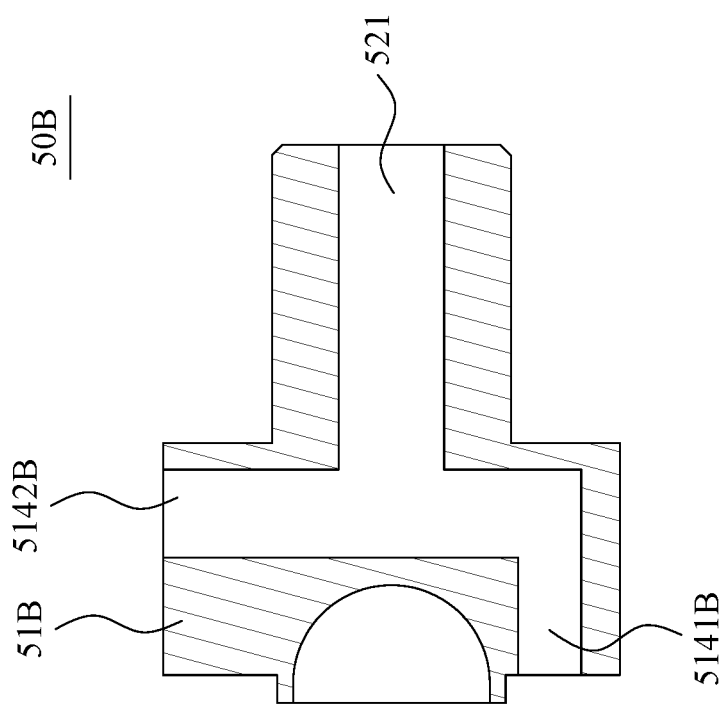
FIG. 15 shows a cross-sectional view along the line C-C in FIG. 14.

As shown in FIGS. 14-15, the difference between the third embodiment and the first embodiment is: first, the second opening of each of the second channels 5142B and the first channel 5141B communicating with each of the second channels 5142B are located at the opposite sides of the head portion 51B; second, the second end of each of the second channels 5142B located inside the head portion 51B communicates with the first channel 5141B communicating with the second channel 5142B; and third, the middle of each second channel 5142B communicates with the air intake channel 521.

Compared with the first embodiment, because the second opening of each of the second channels 5142B of the third embodiment and the first channel 5141B communicating with each of the second channels 5142B are located on opposite sides of the head portion 51B, the thickness at the center of the head portion 51B in the third embodiment may be insufficient, and the structure may be fragile and easy to break.

Compared with the first embodiment, because the second opening of each of the second channels 5142B of the third embodiment and the first channel 5141B communicating with each of the second channels 5142B are located on the opposite sides of the head portion 51B, the second channel 5142B must be drilled to the second end of the first channel 5141B on the opposite side to be able to communicate with the second end of one of the first channels 5141B and the air intake channel 521 at the same time. The drilling is deeper, the cost is higher, and the degree of damage to the inside of the head portion 51B may also be higher, which weakens the structural strength of the head portion 51B.

In addition, the remaining effects of the third embodiment are completely the same as those of the first embodiment.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A pilot relief valve, comprising:
   a sleeve;
   a valve body disposed at one end of the sleeve and having a through hole;
   a piston disposed in the sleeve;
   an adjusting member disposed on the sleeve and used for adjusting a position of the piston;
   a support base disposed in the sleeve and comprising a head portion and a rod portion; the head portion having a first surface, a second surface, and an outer side surface and at least one exhaust channel being provided; the first surface of the head portion formed with a groove; a gap formed between the outer side surface of the head portion and an inner side surface of the sleeve; a first end of the at least one exhaust channel penetrating the first surface of the head portion and formed with a first opening on the first surface of the head portion, the first opening located at one side of the groove, and a distance formed between the first opening and the groove; the rod portion disposed on the second surface of the head portion and provided with at least one air intake channel; a second end of the at least one exhaust channel communicating with the at least one air intake channel;

a blocking member arranged in the groove and used to open and close the through hole of the valve body; and an elastic member disposed in the sleeve and sleeved on the rod portion, with two ends of the elastic member respectively against the piston and the second surface of the head portion.

2. The pilot relief valve according to claim 1, wherein the head portion is provided with a plurality of exhaust channels, each of the exhaust channels comprises a first channel and a second channel, first ends of the first channels penetrates through the first surface of the head portion and are formed with the first openings on the first surface of the head portion, first ends of the second channels are respectively in communication with second ends of the first channels, and second ends of the second channels are in communication with the at least one air intake channel.

3. The pilot relief valve according to claim 2, wherein the first ends of the second channels penetrate through the outer side surface of the head portion and are formed with second openings, and the second openings are disposed symmetrically.

4. The pilot relief valve according to claim 3, wherein the first channels are arranged at intervals around the groove along a circumferential direction.

5. The pilot relief valve according to claim 3, wherein the second opening of each of the second channels and the first channel communicating with each of the second channels are located on a same side of the head portion.

6. The pilot relief valve according to claim 5, wherein the first channels are arranged at intervals around the groove along a circumferential direction.

7. The pilot relief valve according to claim 3, wherein the second openings of each of the second channels and the first channel communicating with each of the second channels are located on opposite sides of the head portion.

8. The pilot relief valve according to claim 7, wherein the first channels are arranged at intervals around the groove along a circumferential direction.

9. The pilot relief valve according to claim 3, wherein the at least one air intake channel extends along an axis of the rod portion and penetrates both ends of the rod portion.

10. The pilot relief valve according to claim 9, wherein the first channels are arranged at intervals around the groove along a circumferential direction.

11. The pilot relief valve according to claim 2, wherein the at least one air intake channel is located on an outer side surface of the rod portion, extends along a length of the rod portion, and penetrates both ends of the rod portion; the second channels are located on the second surface of the head portion and extends along a width of the head portion.

12. The pilot relief valve according to claim 11, wherein the first channels are arranged at intervals along a circumferential direction, and the rod portion is provided with a plurality of air intake channels, and the air intake channels are arranged at intervals along a circumferential direction; the second channels are respectively in communication between the first channels and the air intake channels.

13. The pilot relief valve according to claim 12, wherein the first channels surround the groove.

* * * * *